INVENTOR.
WALTER V. STEARNS
BY
Corey, Hart & Stemple
ATTORNEYS

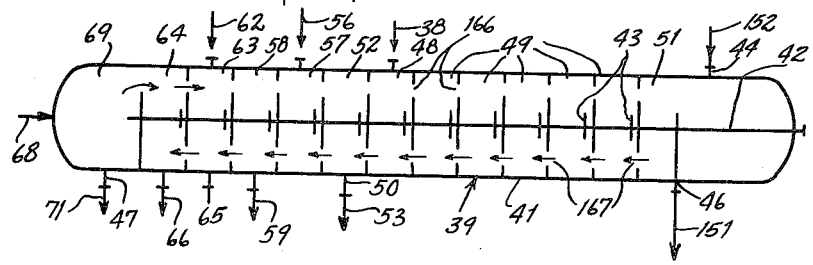
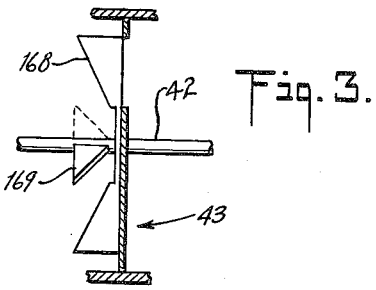
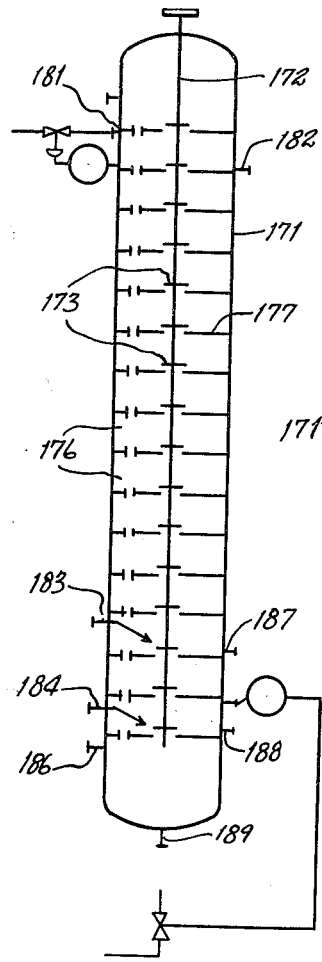
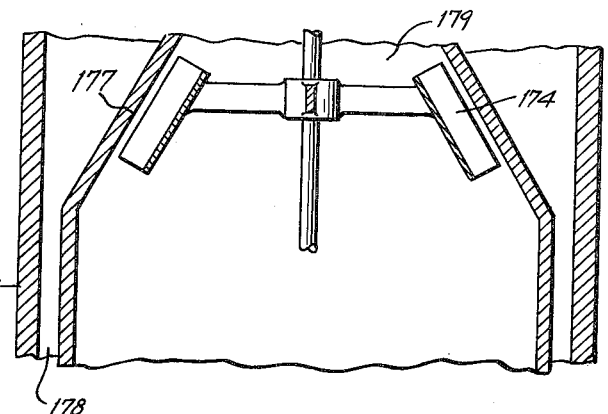

May 11, 1965 W. V. STEARNS 3,182,463
REFRIGERATION METHOD FOR REDUCING THE SALT CONTENT OF BRINE
Filed July 20, 1959 3 Sheets-Sheet 3
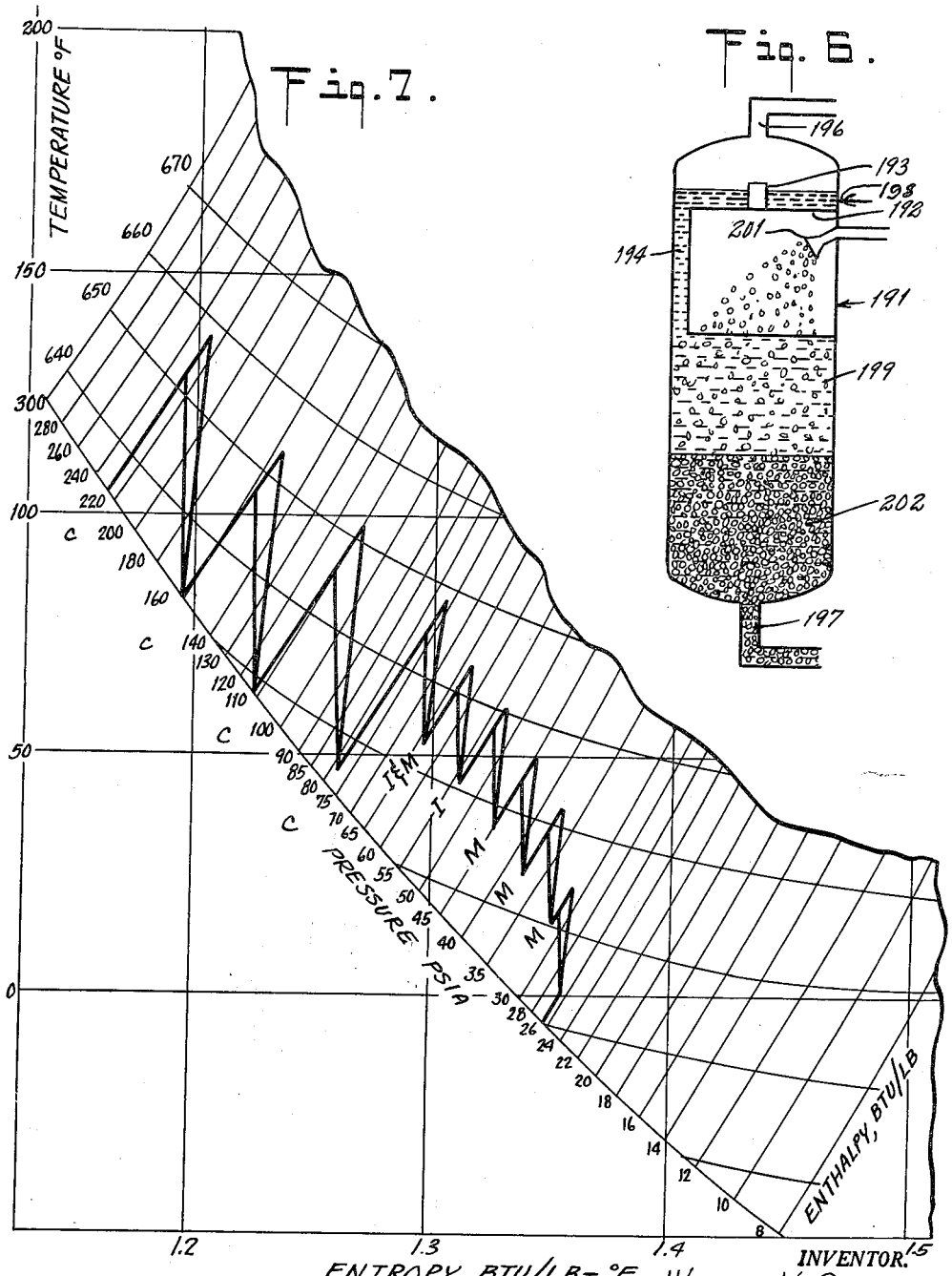
INVENTOR.
WALTER V. STEARNS
BY
Corey, Hart & Stemple
ATTORNEYS

United States Patent Office 3,182,463
Patented May 11, 1965

3,182,463
REFRIGERATION METHOD FOR REDUCING THE SALT CONTENT OF BRINE
Walter V. Stearns, White Plains, N.Y., assignor of one-half to Dayton R. Stemple, Jr., New York, N.Y.
Filed July 20, 1959, Ser. No. 828,284
25 Claims. (Cl. 62—58)

This invention relates to new and useful improvements in refrigeration and more particularly in the reduction of the salt content of water by crystallization of ice from dilute brine solutions such as sea water or other brackish water containing an undesirable quantity of dissolved salt.

The supply of fresh or potable water has become an urgent worldwide problem and attention has constantly been focused on the apparent inexhaustible sea water supply but the approximately 3.75% saline content makes sea water generally unusable. In addition, there are brackish water sources having a salt content which make the water unsuitable for most uses.

Many efforts at distillation have been attempted but high heat of vaporization, fouling, corrosion and inability to obtain a brine concentrated enough to produce salt as a by-product have all served to defeat an economically practical distillation process.

Various chemical methods have also been attempted but relatively high expense, contamination of the water with the added chemicals, the general solubility of sodium and chloride salts and other factors have to the present time overcome the economic propriety of such methods.

The freezing of brine is well known as a means of separating salt from water, inasmuch as ice crystals form at higher temperatures than salt crystals. Moreover, at lower temperatures where salt crystallizes, the salt settles and the ice floats to achieve gravimetric separation. However, when the ice is physically separated from the remaining brine, the ice surface is wet with the brine which must be removed by washing with fresh water and consequently the net yield has been small. Furthermore, it is difficult to separate an ice-brine slurry of more than 50% ice, as the ice crystals tend to regelate, trap brine, and are difficult to filter. In fact, 40% of ice is considered high for successful separation.

Various methods of refrigeration have been proposed in such processes including auto-refrigeration in which ice is produced by flashing a water solution into a high vacuum zone at a pressure in the zone sufficiently low to chill the brine below its freezing point. However, this requires excessively large amounts of vapor by volume to be separated and maintained at very low pressures. Another refrigeration method proposed is to introduce the refrigerant directly into the brine but this has been found to be inefficient from a refrigeration standpoint and also over a period of time will contaminate the water produced.

It is an object of this invention to reduce the salt content of dilute brine by freezing ice in the brine and separating it therefrom in such a manner that the loss of energy in refrigeration is extremely low, whereas the recovery of water is high so that the economics of producing water in this manner are such as to be considered practical.

It is a further object of this invention to provide an efficient and novel means of refrigeration.

It is another object of this invention to provide a novel and efficient means of washing and separating ice from an ice-brine slurry.

I have found that ice can be efficiently separated from brine by providing a counter-current ice washer in which the ice is moved toward the warm end against the movement of water toward the cold end which starts as fresh water at the warm end and becomes concentrated brine at the cold end.

An original ice-brine slurry frozen from the original brine is introduced to the washer intermediate the ends and in addition, brine is bled-off at successive points between the original slurry entry and the cold end, frozen to a slurry and introduced to the washer at successive points nearer the cold end than the associated withdrawal point, the last such slurry being introduced at or near the cold end. The ice is withdrawn from the warm end, generally after melting, and concentrated brine is withdrawn near the cold end.

This refreezing of successive and more concentrated brines after separation from the ice may be repeated several times to recover as much ice as possible from the original dilute brine and also to concentrate the brine to the point where the salt will be easier to recover, e.g., near to the saturation point of 21% NaCl in the brine at −6° F. The warm end of the washer will be at approximately 32° F. with a mixture of ice and fresh water in equilibrium so that the cold fresh water will be withdrawn at about 32° F.

I have found that the cold (almost saturated) brine can be returned through the refrigeration system and passed through a plurality of heat exchangers with the refrigerant so arranged at temperature and pressure levels so that the refrigerant is cooled while the brine is being warmed. In addition, I have also found that the cold fresh water being withdrawn from the washer can be taken back to the refrigeration system for heat exchange with the refrigerant to cool or condense same, while a portion of the fresh water is being warmed prior to being recycled to the washer for fresh water feed where it serves to both wash and melt the ice in the washer. Moreover, the compression of the refrigerant is carried out in multi-stages in conjunction with the cooling or condensing thereof by multi-heat exchanges with both the cold fresh water and the cold brine taken from the washer.

I have also found that the brines may be frozen to slurries by spraying finely divided particles of the brine onto the surface of a liquid refrigerant immiscible with water and having a specific gravity less than the slurry so that the slurry settles through the refrigerant and can readily be removed.

With these and other objects and features in view, the nature of which will be more apparent, the invention will be more clearly understood by reference to the drawings, the accompanying detailed description and the appended claims.

In the drawings:

FIG. 2 is an enlarged vertical section taken through the horizontal washer of FIG. 1;

FIG. 3 shows one of the agitators from the horizontal washer;

FIG. 4 is an enlarged vertical section taken through a vertical washer;

FIG. 5 shows one of the agitators in the vertical washer;

FIG. 6 is a detailed diagrammatic section through a modified chiller that may be used to produce the slurries; and FIG. 7 is a temperature-entropy diagram for ammonia covering the range demonstrated in the flow sheet of FIG. 1.

Figure 1:
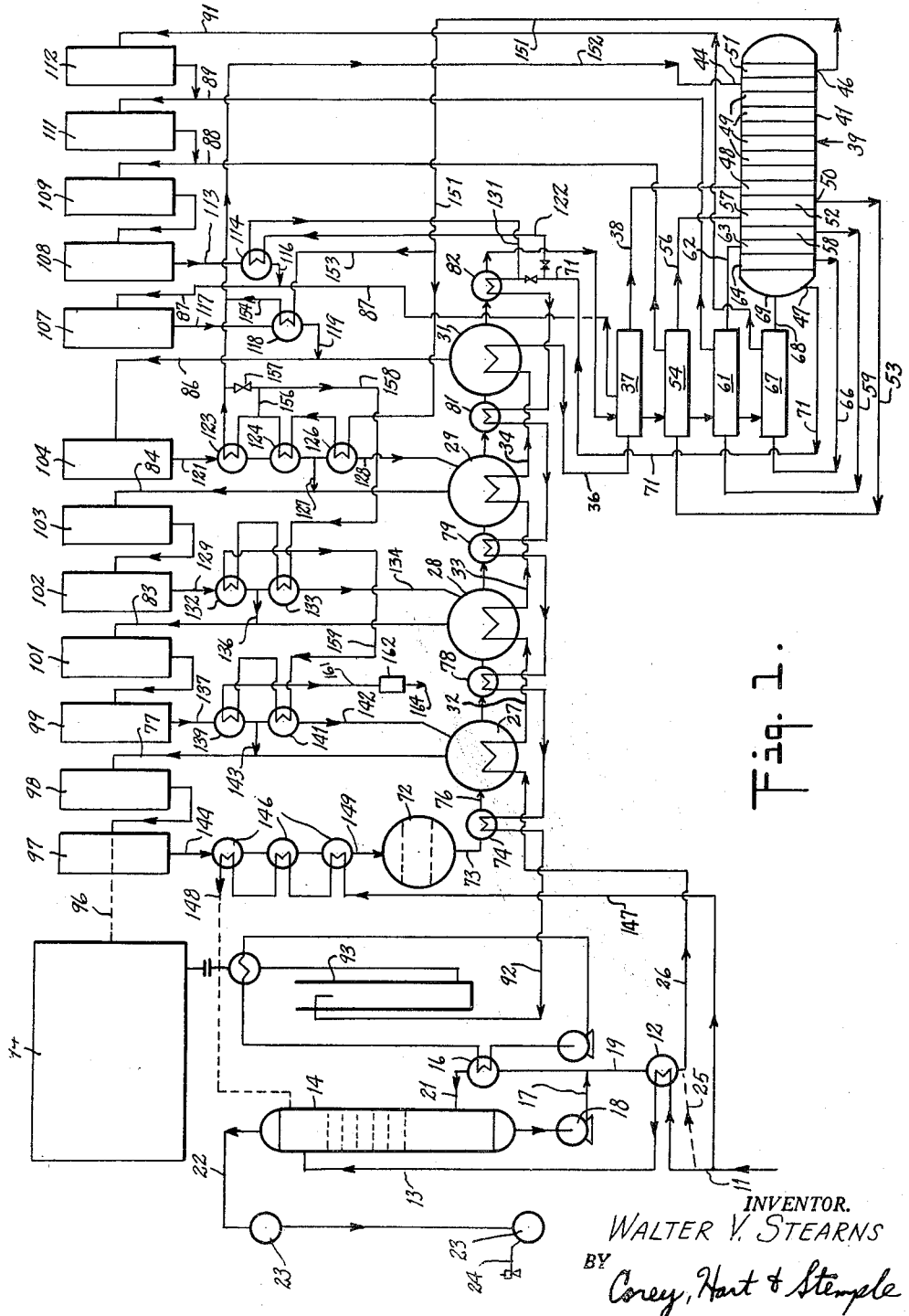
FIG. 1 is a schematic flow sheet of a complete reduced salt-water recovery system constructed in accordance with this invention.

This invention as illustrated is embodied in a multistage refrigeration system and a countercurrent ice washing unit wherein the solid ice moves toward the warm end and liquid moves toward the cold end with fresh water (dilute brine) removed at the warm end and concentrated brine removed near the cold end as the end products, the original brine being introduced as a slurry intermediate the ends and successive liquid brines being bled off toward the cold end, frozen to slurries, and recycled to the washer at a point nearer the cold end than the associated withdrawal point. Both of the end products, namely, cold water and cold brine, are used in a plurality of heat exchanging stages to remove heat from the basic refrigerant utilized in the system. Moreover, a certain amount of fresh water is recycled to absorb heat from the system outside the washer and then returned to melt the ice.

Reasonably clean sea water is pumped through line 11 to heat exchanger 12 where the fresh sea water flows countercurrently against deaerated sea water and then through line 13 to the top of the deaerator 14 where the sea water flows downwardly against water vapor generated in the reboiler 16 and is withdrawn through line 17 by pump 18 and passed through line 19 back to the heat exchanger 12. The reboiler 16 draws some water from line 17 which is recirculated to line 21 into the deaerator as steam and water. The water vapor and removed air are passed through line 22 to a condenser 23 where the bulk of the water vapor is collected as condensate and the air returned to the atmosphere either under its own pressure or by means of an ejector 24. The deaerator described is a conventional one and is not considered an essential part of my invention, as it may be by-passed and the sea water brine introduced directly into line 26 from line 11 as shown by dotted line 25 on FIG. 1. However, for commercial operation, the deaerator may offer a substantial advantage in reducing oxygen corrosion or eliminating explosive mixtures in the system.

The initial brine at about 105° (all temperatures herein are Fahrenheit) is passed from line 26 through a flash evaporator chiller 27 where the temperature is reduced to about 90°. The brine continues through successive evaporator chillers 28, 29 and 31 by way of successive lines 32, 33 and 34 and has the temperature reduced successively to 75°, 57° and 36°. After leaving chiller 31 through line 36, the brine is taken to a scraper evaporator chiller 37 where ice is crystallized from the brine at 26°, the amount about 30% of the feed brine, and the resultant slurry passed through line 38 to the countercurrent ice washer 39.

The washer 39 consists of a long horizontal cylinder 41 having an agitator shaft 42 with blades 43 thereon and divided into a plurality of chambers which permit a flow of liquid from right to left and movement of ice from left to right. At the right-end there is a warm water inlet 44 on the top of the cylinder and a cold water discharge 46 at the bottom of the cylinder. Near the left-end of the cylinder on the bottom is a concentrated brine outlet 47. If the brine is to be concentrated near the saturation point of about 21% NaCl without adding other salts to reduce the working range, the temperature range at the left-end will be approximately 2.5°. At the right-end of the cylinder fresh water and ice will be in equilibrium during operation so that the temperature will be about 32°.

As indicated before, the fresh water moves from the right-end of the cylinder toward the left-end becoming progressively more concentrated brine in this passage. The initial slurry passing through line 38 is introduced into intermediate compartment 48, there being several compartments 49 to the right thereof. The introduced slurry is mixed with slurry previously in the compartment and the ice then separated and passed to the right into the first of compartments 49, with the resultant slurry there being mixed and separated and this process repeated until the ice reaches the last compartment 51 on the right end, the number of compartments being such that the water melting from the ice reaching compartment 51 will be of desirable low salt concentration.

A first brine outlet 50 is positioned at compartment 52 which is immediately to the left of compartment 48 where the initial slurry was introduced. This brine is relatively more concentrated than the original and requires a lower temperature to crystallize substantially more ice. This relatively more concentrated brine (5.8%) is passed through line 53 to the scraper chiller 54 where ice is again crystallized at 20°, amounting to about 37.5% of the feed passing into this chiller. The resultant slurry is then passed through line 56 to compartment 57 which is two stages to the left of compartment 48 where the original slurry was introduced, inasmuch as the present brine is now even more concentrated as a result of two crystallization steps. Once again, the introduced slurry is agitated, the ice separated and moved to the right to compartment 52 while the concentrated brine (9.7%) is withdrawn after agitation with ice from compartment 58 through line 59 and passed to scraper chiller 61 where about 36.5% of the feed passing into this chiller is again crystallized at 12.5° as ice. The resultant slurry is then passed through line 62 into compartment 63 where after agitation the ice is separated and moved into compartment 58 on the right, and the brine joins the countercurrent movement to the left and will be withdrawn primarily from the compartment 64 through line 66 as 14.8% brine and passed to scraper chiller 67 where about 35% of the feed into this chiller is crystallized as ice at a temperature of about 2.5°. The resultant slurry is passed through line 68 into the left-most compartment 69 of the washer where the slurry is agitated and the ice separated therefrom to begin its movement to the right in the washer. The highly concentrated brine will be withdrawn through line 71 having a temperature of approximately 2.4° and a salt content slightly under 21%.

The refrigerant, namely liquid ammonia, is stored in an accumulator 72 at 105° at 236 p.s.i.a. The ammonia is withdrawn through line 73, passes through sub-cooler 74 and line 76 at 165 p.s.i.a. and 82° and then into chiller 27, where the ammonia required for cooling is vaporized and passed upwardly through line 77. Thereafter, the liquid ammonia passes successively through chillers 28, 29 and 31 at 65°, 47°, and 30° respectively, after passing through the associated sub-coolers 78, 79 and 81. The ammonia then passes through sub-cooler 82 where it is cooled to 18° and 60 p.s.i.a. and then successively through scraper chillers 37, 54, 61 and 67 at 16°, 9°, 2°, −6.6°, and 44, 38, 32 and 26 p.s.i.a., respectively. From each chiller the corresponding vaporized ammonia is taken off through successive lines 77, 83, 84, 86, 87, 88, 89 and 91. The ammonia vapors from the various chillers are not returned to the compressor at one point but instead are returned to the compressor at various stages as shown corresponding with the particular pressure of the ammonia on leaving the associated chiller. The compression stages will be more fully described hereinafter.

The ammonia is cooled prior to entry into chillers 27, 28, 29, 31 and 37 by an associated sub-cooler 74, 78, 79, 81 and 82 by heat exchange with the cold concentrated brine that has been drawn from the cold end of the ice washer so that the brine has been raised from a temperature of 2.5° at the washer to 24°, 34°, 48°, 65° and 82° successively before it passes through line 92 to the spray tower 93 where the brine may be further concentrated or dried by means of waste heat from the compressor prime mover as shown in the drawing or may be concentrated by other means well known to the art. Part of the cold brine at 2.5° may be taken through line 122 to cooler 114 and returned through line 131 at 30°. The ammonia vapors are also cooled and/or condensed by heat exchange with the cold fresh water that is discharged at 46 from the right side of the washer and also if desired, at one stage by the cold brine.

This particular unit has been designed for a compressor having twelve stages shown diagrammatically to include the prime mover 94, shaft 96 and the twelve impellers reading from high compression to low as 97, 98, 99, 101, 102, 103, 104, 107, 108, 109, 111 and 112. In the compression cycle, the ammonia introduced into stage or impeller 112 is at about 26.6 p.s.i.a. and −1°, leaving this stage at 31.2 p.s.i.a. and 24°. It is then mixed with ammonia from riser 89 at about 31.2 p.s.i.a. and +2°, the resultant mixture entering impeller 111 at 31 p.s.i.a. and 14° and leaving at 37.5 p.s.i.a. and 40°. The ammonia leaving 111 is mixed with the vapors from riser 88 at 37.5 p.s.i.a. and 8° to give a mixture at 37.3 p.s.i.a. and 24° entering stage 109. The ammonia leaving stage 109 after compression to 44.93 p.s.i.a. and 51° is taken directly to stage 108, leaving at 51 p.s.i.a. and 70°.

The ammonia from stage 108 is taken through line 113 to cooler 114 where it is heat exchanged with a portion of the cold brine at about 2.4° coming from the ice washer. The ammonia is cooled to about 35° and 42.4 p.s.i.a. and passes through line 116 where it passes into riser 87 and is mixed with vapors from chiller 37 at 44.9 p.s.i.a. and 16° to give a resultant mixture at 42.2 p.s.i.a. and 34° to pass into compressor stage 107. The ammonia is now passed through stage 107 to reach 63.8 p.s.i.a. and 121° and then taken off through line 117 to cooler 118 to be heat exchanged with the fresh water circuit to reach 63.7 p.s.i.a. and 50°. It is then led through line 119 to line 86 where it joins ammonia from chiller 31 at 63.5 p.s.i.a and 33° and the combined ammonia at 63.5 p.s.i.a. and 51° is fed back into stage 104. After passing stage 104, the ammonia emerges through line 121 at about 133° and 77 p.s.i.a. to a partial condenser unit which comprises two cooler units 123, 124 and a condenser 126 where there is heat exchanged between the ammonia and the fresh water circuit from the ice washer. The remaining ammonia vapors at about 75° and 77 p.s.i.a. are fed off through line 127 to line 84 to be mixed with ammonia from chiller 29 at 76.5 p.s.i.a. and 42° to give a resultant mixture at 76.5 p.s.i.a. and 47° to pass into stage 103. The condensed ammonia from condenser 126 is led through line 128 at about 42° and 77 p.s.i.a. to the chiller 29 where the ammonia is about the same temperature and pressure.

The gaseous ammonia from stage 103 goes also through stage 102 and is led off through line 129 at about 98° and 111 p.s.i.a. to the partial condensing unit including an upper cooler 132 and a lower condenser 133 where the ammonia is again heat exchanged with the fresh water circuit to produce liquid ammonia at 110 p.s.i.a. and 63° which is led through line 134 to chiller 28 and a gaseous ammonia at 63° and 111 p.s.i.a. which is led through line 136 to line 83 where it is mixed with vapor in riser 83 at 110.5 p.s.i.a. and 63° to give a resultant mixture at 110 p.s.i.a. and 63° passing to stage 101. The gaseous ammonia then passes through two stages, namely 101 and 99, leaving the latter at 115° and 159 p.s.i.a. through line 137 to a partial condenser unit including an upper cooler 139 and a lower condenser 141, the condensed ammonia at 159 p.s.i.a. and 83° being fed back through line 142 to chiller 27 and the ammonia vapors at 105° and 167 p.s.i.a. being passed through line 143 to line 77 for mixing with vapors in riser 77 to give a resultant mixture at 82° and 159 p.s.i.a. passing to compressor stage 98. After passing through compressor unit 97, the resultant ammonia at 138° and 233 p.s.i.a passes through line 144 to a full condenser comprising three separate condensers 146 where the ammonia is heat exchanged with the initial brine fed through line 147 entering at about 85° and leaving at about 110° through line 148. This brine may go to the deaerator 14 as shown by the dotted line, be discharged or introduced into the original brine circuit at various places. Completely liquid ammonia is passed through line 149 to the accumulator 72 for recirculation as already now described.

As is noted on the drawings, cold fresh water at about 32° is withdrawn from the ice washer through line 151 and passed to the condenser unit 126 and coolers 123 and 124 and thus having been heated to 40°, the water is returned through line 152 back to the warm water inlet 44 on the ice washer. However, a portion of this water is drawn off through line 153 for heat exchange at cooler 118 and led back into the main circuit by line 154 at 55°. In addition, water from the fresh water circuit is withdrawn through line 156 or bypass valve 157 to enter line 158 to pass to condenser 133 and cooler 132 for heat exchange, then through line 159 at 66° to condenser 141 and cooler 139 from which it is drawn at 88° through line 161 and filter 162 to outlet 164 as fresh water for whatever use may be desired.

FIG. 2 shows the details of the horizontal washer including upper openings 166 between compartments for passage of ice and lower openings 167 for passage of brine. FIG. 3 shows the detail of one of the agitators 43 with peripheral blades 168 and interior blades 169.

Various ways of moving the ice to the right can be utilized, e.g. scoop, scraper and pervious, semi-pervious or impervious belt. If the ice is lifted from each compartment by scoop to permit the brine to drain therefrom and then returned to the next succeeding compartment to the right, the top of the compartments may be open rather than closed as shown. In fact, it would not be necessary to have compartments but merely an elongated washer provided with a belt or other means to move ice to the right but it has been found that a more efficient separation of the ice is effected with compartments so that the ice may be physically separated from the brine at each compartment.

Although a horizontal washer is preferred, the vertical washer such as shown in FIGS. 4 and 5 may be used, as the ice will move upwardly and the brine downwardly due to gravity. The vertical washer comprises an elongated cylinder 171 with a shaft 172 and a plurality of agitators 173, the agitators having blades 174. The compartments 176 are separated by baffles 177 so that the liquid flows downwardly through channels 178 and the ice rises in the center through passages 179. The warm water enters at inlet 181, cold water is drawn off at outlet 182 while successively colder and more salt concentrated slurries are introduced at inlets 183, 184 and 186 while successively more concentrated brine is removed for refreezing at outlets 187 and 188 and the final brine removed at outlet 189.

FIG. 6 shows a modified novel slurry freezer which may be substituted for the scraper chillers 37, 54, 61 and 67. This freezer comprises a tower 191 having a plate 192 provided with a riser 193 permitting vapors to escape while maintaining liquid on the plate. A downcomer 194 drains liquid from the plate. Vapor is discharged from the top outlet 196 and liquid (slurry) is removed at the bottom outlet 197. A liquid refrigerant at the proper temperature is introduced at inlet 198 and maintained at a level on the plate 192. The liquid refrigerant is lighter than, and immiscible with, water and forms a liquid phase 199 in the column underneath and spaced from the plate. In the space between the plate and refrigerant phase, there is a sprayer 201 through which the cold brine is sprayed in finely divided small droplets. These small particles, on striking the liquid refrigerant, fall therethrough and freeze (temperature being adjusted to insure that salt does not crystallize) so that a slurry 202 is formed at the bottom of the tower underneath the refrigerant. The resulting refrigerant vapors pass through riser 193 and discharge through the top outlet 196 to be condensed and recycled in any known manner. The slurry is removed from the bottom outlet 197 and passed to the appropriate inlet of the washer 39.

Various refrigerants having a lower specific gravity and being immiscible with the slurry can be used in this particular chiller, e.g. propane, which has a specific gravity of 0.54 compared to 1.08 to 1.15 for the various slurries being formed.

On the temperature-entropy diagram of FIG. 7, the behavior of the ammonia has been plotted as described in detail hereinbefore and need not be further explained.

It will be appreciated that this invention is generally concerned with the conversion of sea water to potable water but, of course, is more basically concerned with the reduction of the salt content of water, the salt generally being sodium chloride but the same process steps would be applicable to other soluble salts that behave in the same manner. This process will reduce the sodium chloride content of sea water to less than 100 parts per million (0.01%), whereas 500 p.p.m. is considered potable in many areas. Depending upon the ultimate use of the water, it may be desirable from the standpoint of economics to retain relatively higher amounts of salt in the end product and, of course, this is within the scope of the present invention which involves basically a reduction of salt content of a given brine. Brine is used herein to indicate water with sufficient salt therein to be considered undesirable for any particular use and includes sea and brackish waters having considerably less salt concentration than more conventional refrigeration brines of relatively high salt concentration.

As it is well known, sodium chloride brine will turn solid at about −6° which is at a 21.6% concentration. In order to avoid this precipitation, it is known to introduce other salts into the brine, for example, calcium chloride or magnesium chloride, which then lowers the freezing temperature of the brine. With calcium chloride, one can work with the brine down to −30°. The use of such brines is contemplated within the scope of this invention and also the co-precipitaiton of ice and salt can be utilized herein, inasmuch as the solids will separate by gravity, leaving the brine to be removed by washing as described hereinbefore.

The brine described herein has been frozen four times in succession to reach the concentration of approximately 20% brine. The successive number of freezings is, of course, variable and it is unnecessary to go to such a highly concentrated brine, although it is preferred so as to make recovery of salt easier from the brine.

The concentration of brine toward the cold end of the washer and the temperature will, of course, be controlled by the balance of input of original slurry at inlet 38, as against the discharge of fresh water (or dilute brine) through outlet 164 and concentrated brine through outlet 47. All other inflow and outflow are merely internal recycles including all slurries except the original, the wash water which generally represents about 5% of the ice present in the washer, and the warm water return for melting ice. It is possible, of course, to exert control at various points but it is easier to do so by determining the concentration of the brine, at a point 65, for example, between outlets 59 and 66, and according to this concentration, automatically control the discharge through outlet 47.

The number of compartments in the ice washer is quite variable, depending upon several factors, for example, how much salt reduction is to be accomplished, the amount of fresh water to be put into the wash cycle, etc., and from 5 to 25 such compartments are preferred. It has been found that with about twelve compartments and drawing out 95% of the ice as fresh water (5% remaining for wash), the fresh water will have less than 100 parts per million of dissolved solids. The number of compartments is inversely proportional to the amount of fresh water required for washing.

The refrigerant disclosed in the specific example is ammonia (except propane, for the modified chiller of FIG. 6) but any gaseous refrigerant operable within the working ranges could, of course, be used. Moreover, the refrigerator aspect of the process, apart from the ice washing unit, could be used for other refrigerating processes and various other refrigerating processes could be substituted for the present one to be used in conjunction with the ice washer which, in itself, is a novel aspect of this invention. Various other sub-process aspects of the larger operation described herein are novel by themselves without regard to the over-all operation.

The process has been described herein in quite some detail as to temperatures, pressures, etc., only to show that an efficient process is involved and one that can produce from the sea ten million gallons of water per day with less than 100 parts per million dissolved solids at a cost of around 23¢ per thousand gallons. However, depending upon the many variables that may arise, all these temperatures and pressures are subject to change within the scope of this invention as will be obvious to anyone skilled in the art. Moreover, the use of the cold brine and cold fresh water to cool and condense refrigerant in multi-stages is subject to variation of the location of coolers and condensers and whether brine or fresh water is used as the cooling agent at a given point.

The salt recovered from drying the brine at spray tower 93 may be used to reconstitute sea water for swimming pools or other purposes.

I claim:

1. A method of reducing the salt concentration of an original brine comprising freezing said original brine to form an original slurry, introducing said original slurry intermediate the ends of a countercurrent washer said washer having a cold end and a warm end, moving the liquid toward said cold end, moving the ice toward said warm end, removing a further brine from said washer intermediate said cold end and the original slurry inlet point, freezing said further brine to form a further slurry, introducing said further slurry at said cold end, withdrawing brine concentrated relative to said original brine intermediate said cold end and the further brine outlet point, melting said ice at said warm end to produce cold water, and withdrawing brine diluted relative to said original brine at said warm end.

2. The method of claim 1 wherein said washer is provided with a plurality of compartments transverse to the longitudinal axis.

3. The method of claim 2 wherein a portion of said withdrawn cold water is heated and recycled to said warm end to aid the melting of said ice.

4. A method of reducing the salt concentration of an original brine comprising freezing said original brine to form an original slurry, introducing said original slurry intermediate the ends of a countercurrent washer, said washer having a cold end and a warm end, moving the liquid toward said cold end, moving the ice toward said warm end, removing a plurality of further brines at successive outlets from said washer intermediate said cold end and the original slurry inlet point, freezing said further brines to form respective further slurries, introducing the last of said further slurries at said cold end, introducing the other of said further slurries to said washer at points intermediate the removal point of the particular slurry and the next successive slurry, withdrawing brine concentrated relative to said original brine intermediate said cold end and the last further brine outlet point, melting said ice at said warm end to produce cold water, and withdrawing brine diluted relative to said original brine at said warm end.

5. The method of claim 4 wherein at least three said further brines are removed.

6. The method of claim 5 wherein said slurries are less than about 40% ice.

7. The method of claim 6 wherein said counter-current washer is a horizontal column.

8. The method of claim 7 wherein a portion of said withdrawn cold water is heated and recycled to said warm end to aid the melting of said ice.

9. The method of claim 8 wherein said concentrated brine is about 20% salt and said diluted brine is less than 0.05% salt.

10. The method of claim 8 wherein said diluted brine is less than 0.01% salt.

11. The method of claim 8 wherein the net liquid movement toward said cold end is about 5% of said ice in said washer.

12. The method of claim 8 wherein said cold end is about 2.5° and said warm end is about 34°.

13. A method of reducing the salt concentration of an original brine comprising freezing said original brine to form an original slurry, introducing said original slurry intermediate the ends of a counter-current washer, said washer having a cold end and a warm end, agitating said original slurry in said washer, moving the original slurry ice toward said warm end, moving the original slurry brine toward said cold end, withdrawing a second brine at a discharge point between said cold end and said intermediate point, freezing said second brine to form a second slurry, introducing said second slurry into said washer between said discharge point and said cold end, agitating said second slurry, moving the second slurry ice toward said warm end, moving said second slurry brine toward said cold end, withdrawing brine concentrated relative to said original brine near said cold end, melting said ice at said warm end to produce cold water and withdrawing brine diluted relative to said original brine at said warm end.

14. A method of reducing the salt concentration of an original brine comprising moving ice toward the warm end of a counter-current washer having separate compartments, moving liquid toward the cold end of said washer, reducing the temperature of said original brine to form a first ice-brine slurry by a plurality of successive heat exchange steps with a refrigerant in multi-stage gas-liquid equilibrium, introducing said first slurry into said washer at a point intermediate said washer ends, withdrawing a plurality of further brines from said washer at successive points between said intermediate point and said cold end, each succeeding withdrawal being nearer said cold end, freezing slurries with each further brine by a further heat exchange step with said refrigerant in further multi-stage gas-liquid equilibrium, introducing each said further slurry except the last slurry at a succeeding inlet point between said cold end and the associated brine outlet, introducing said last slurry at said cold end, withdrawing a brine concentrated relative to said original brine near said cold end, withdrawing brine diluted relative to said original brine at said warm end, heat exchanging said dilute brine a plurality of times with said refrigerant at relatively warm stage levels, returning said warm dilute brine to said warm end at sufficient temperature to melt the ice at least in part and heat exchanging said cold concentrated brine a plurality of times with said refrigerant at relatively warm stage levels.

15. The method of claim 14 wherein said refrigerant is ammonia.

16. The method of claim 14 wherein said dilute brine partially condenses said refrigerant gas.

17. The method of claim 14 wherein said dilute brine partially condenses said refrigerant gas in a plurality of steps.

18. The method of claim 14 wherein said concentrated brine partially condenses said refrigerant gas.

19. The method of claim 14 wherein said concentrated brine is heat-exchanged against said refrigerant liquid.

20. The method of claim 14 wherein said dilute brine is heat-exchanged against said refrigerant gas.

21. The method of claim 14 wherein said refrigerant liquid is alternatively heat exchanged against said concentrated brine and cooled by flash evaporation.

22. The method of claim 14 wherein said refrigerant is compressed in multi-stages corresponding to said plurality of successive heat exchange steps to reduce the temperature of said brines and said heat exchanging of said refrigerant at warm levels with said dilute brine and said concentrated brine corresponds to said multi-stage compression stages.

23. The method of claim 14 wherein said original brine and said refrigerant are heat-exchanged a plurality of times in a concurrent cycle and said concentrated brine and said refrigerant are heat-exchanged a plurality of times in a counter-current cycle, said refrigerant alternating between exchange with said original brine and said concentrated brine.

24. The process of claim 23 wherein said refrigerant is recovered at a multiplicity of levels corresponding with said concentrated brine exchanges.

25. The process of claim 24 wherein said refrigerant is condensed for recovery and returned to the liquid refrigerant side at a point where the newly condensed refrigerant is at about the same temperature as the liquid refrigerant.

References Cited by the Examiner

UNITED STATES PATENTS

| | | | |
|---|---|---|---|
| 1,991,384 | 2/35 | Field et al. | 62—1 |
| 2,315,762 | 4/43 | Ax et al. | 62—58 |
| 2,420,418 | 5/47 | Dons et al. | |
| 2,540,083 | 2/51 | Arnold | 62—124 X |
| 2,553,623 | 5/51 | Zumbro | 62—510 X |
| 2,617,273 | 11/52 | Findlay | 62—58 |
| 2,683,178 | 7/54 | Findlay. | |
| 2,764,880 | 10/56 | Wenzelberger | 62—58 |
| 2,796,743 | 6/57 | McFarlan | 62—510 |
| 2,815,288 | 12/57 | McKay | 62—58 X |
| 2,821,304 | 1/58 | Zarchin | 62—58 |
| 2,886,587 | 5/59 | Kolner. | |
| 2,896,419 | 7/59 | Thompson | 62—58 |
| 2,897,659 | 8/59 | Wegner | 62—510 X |
| 2,904,511 | 9/59 | Donath. | |

FOREIGN PATENTS 70,507  6/46  Norway.

OTHER REFERENCES

"Development of a Direct-Freezing Continuous Wash Separation Process for Saline Water Conversion," Progress Report 23, pages 2 and 3, Figures 1 and 2.

NORMAN YUDKOFF, *Primary Examiner.*

ROBERT A. O'LEARY, GEORGE D. MITCHELL,
*Examiners.*